Patented June 26, 1951

2,558,494

UNITED STATES PATENT OFFICE 2,558,494

POLYMERIZING FATTY OILS

Piet Meerburg, The Hague, Netherlands, assignor to Shell Development Company, San Francisco, Calif., a corporation of Delaware No Drawing. Application December 3, 1947, Serial No. 789,564. In the Netherlands December 10, 1946

6 Claims. (Cl. 260—407)

1

This invention relates to the catalytic polymerization of fatty oils and relates more particularly to the catalytic polymerization of non-drying and semi-drying fatty oils.

Processes have been disclosed heretofore involving the treatment of fatty oils with relatively small amounts of catalytic materials. Polymerization catalysts heretofore employed in these treatments are generally limited to such highly reactive materials as hydrogen fluoride, boron fluoride, and aluminum chloride. The need to rely upon the use of such materials entails distinct disadvantages often seriously detracting from the practical value of the process. Operational procedures are rendered complex and costs of the methods are materially increased when resorting to the use of catalysts which are entirely in the gaseous state or which must be maintained at all times in completely anhydrous condition. The highly reactive nature of such catalysts has the further disadvantage of rendering extremely difficult the control of specifically desired characteristics of the resulting products or the avoidance of by-product formation in considerable amount.

It has now been found that the fatty oils, such as the non-drying and semi-drying fatty oils, are converted to valuable polymerized products when treated at moderately elevated temperatures with antimony trichloride in an amount at least equal to the stoichiometrical amount of the fatty oils.

Fatty oils polymerized in accordance with the process of the invention comprise the non-drying and semi-drying fatty oils as well as the fatty oils possessing poor drying qualities generally. The process is applied with particular advantage to the fatty oils of animal or vegetable origin having an iodine value below about 160 and preferably below about 140. Examples of the fatty oils converted to valuable polymerized products in accordance with the invention are, rapeseed oil, mustardseed oil, soybean oil, castor oil, sunflowerseed oil, whale oil, sardine oil, sperm oil, corn oil, sesameseed oil, etc. or mixtures comprising two or more of such oils.

Whereas processes disclosed heretofore for the treatment of fatty oils with the aid of a polymerization catalyst generally employ the catalyst in a catalytic amount, that is in a relatively small amount such as, for example, not more than a few per cent of the oil treated, an essential feature of the present invention, necessary to the attainment of the objects thereof, is the utilization of the antimony trichloride catalyst in a substantial amount at least equal to about one half the weight of the oil undergoing polymerization. In general it may be stated that the antimony trichloride is employed in an amount about equal to the stoichiometrical amount of the fatty oil in contact therewith. Preferred conditions comprise the use of the antimony trichloride in a weight ratio of antimony trichloride to fatty oil being polymerized in the range of 0.5 to 1. The use of the antimony trichloride in an amount at least equal to the weight of oil being polymerized is particularly preferred. Higher ratios of antimony trichloride to oil may be employed, however, within the scope of the invention.

The process of the invention is executed at temperatures below about 200° C. and even below about 100° C. The specific temperature employed within the prescribed range will vary to some extent with the nature of the particular fatty oil charged to the process. A temperature in the range of from about 75° C. to about 200° C. is preferred. Still more preferred is the temperature range of from about 80° C. to about 150° C. Somewhat higher or lower temperatures may be employed, however, within the scope of the invention.

The polymerization may be carried out at atmospheric, subatmospheric or elevated pressures. The use of a pressure in the range of from about atmospheric to a moderately elevated superatmospheric pressure of, for example, about 15 atmospheres is preferred.

The time of contact of the antimony trichloride and fatty oil may vary considerably within the scope of the invention depending upon the amount of catalyst and the temperature employed, the specific fatty oil charged and the specific characteristics, particularly viscosity, of the product desired. Thus, the time of contact may vary from about one half to about fifteen hours depending upon the degree of polymerization of the fatty acid which it is desired to obtain. Longer times of contact may be employed within the scope of the invention.

The process of the invention may be carried out in batch, semicontinuous or continuous operation. The antimony trichloride and fatty oil charged may be separately preheated and introduced into a suitable reaction zone provided with conventional heat controlling means. Any suitable type of conventional reactor enabling intimate contact of catalyst and oil may be employed. Effluence from the reactor is passed to suitable product recovery means and catalyst and unconverted material may be recycled to the reaction zone.

Any suitable method for effecting the separation of antimony trichloride from the polymerized product may be resorted to. A suitable method for effecting such separation comprises the dilution of the antimony trichloride-containing reaction products with a solvent, for example, an aromatic hydrocarbon such as benzene, and extracting the diluted products with a mineral acid such as, for example, hydrochloride acid. The hydrochloric acid phase containing the recovered antimony trichloride is separated from the fatty oil polymer phase, and the polymerizate thus obtained is washed with water to remove remaining traces of acid therefrom. The washed polymerizate is subjected to distillation to remove the solvent benzene therefrom. Emulsification during water washing of the polymerizate is obviated by the addition of a higher boiling alcohol such as, for example, isoamyl alcohol. Antimony trichloride is recovered from the hydrochloric acid phase of the extraction step by distillation and returned to the reaction zone.

The following example is illustrative of the polymerization of fatty oils in accordance with the process of the invention. The example is indicative of the variation in characteristics of the polymerized products, as determined by viscosities, obtainable by varying the amount of antimony trichloride, temperature or time of contact.

Example I

In a plurality of separate operations, fatty oils were polymerized by contact with antimony trichloride at a moderately elevated temperature. Antimony trichloride was separated from the polymerized products and the viscosity of each of the polymerizates thus obtained was determined. The particular fatty oil, or mixture of fatty oils, polymerized, and the amount of antimony trichloride and the temperature employed, are indicated in the following table for each of the individual runs. The viscosity of the polymerizate, expressed in degrees Engler at 50° C., of the polymerizate obtained in each of the operations is also given in the following table:

the obtaining of a wider variety of products many of which possess specific characteristics to an extent rendering them applicable with greater efficiency than corresponding products obtained by methods available heretofore. The polymerized products obtained in accordance with the process of the invention may be used as such as lubricants. They are of particular value, however, as additives for greases and mineral lubricating oils, especially steam cylinder oils. A greatly desired characteristic of steam cylinder oils is the ability to separate readily from admixture with condensed steam while still being capable of emulsifying with wet-steam in such a manner that they assure proper lubrication of the cylinders under the conditions of their employment. The products of the present invention have been found to be particularly suited for addition to steam cylinder lubricants to impart such desirable characteristics thereto. Their presence in as small an amount as only about 0.1 to about 0.2% of the steam cylinder oil is sufficient to impart a substantial improvement in the desired properties thereto. The viscosity index of mineral lubricating oils is greatly enhanced by the addition of the polymerized products of the process of the invention. A further application of the polymerized fatty oils of the invention comprises their use as components of textile oils to improve the properties thereof. Since the polymerized fatty oils possess characteristics which in some cases, undergo modification during storage it is preferred, when the product is to be employed as a component of a lubricant or grease to avoid any substantial delay in effecting its admixture with the lubricant or grease. It has been found that the presence of the lubricant or grease inhibits any further substantial modification in the properties of the polymerized fatty oils. The lubricant or grease with which the polymerized products are to be combined may be mixed with the crude polymerized products emanating from the reaction zone, or with the polymerized products during or between any stage of the recovery or

| Oil Charge | Weight Ratio $SbCl_3$ to Oil | Time of Contact, Hours | Temperature, °C. | Viscosity of Charge | Viscosity of Polymerizate |
|---|---|---|---|---|---|
| Rapeseed Oil | 0.5 | 3¾ | 93 | 4.35 | 7.38 |
| Do | 0.75 | 3¾ | 93 | 4.35 | 27.14 |
| Do | 1.0 | 3¾ | 93 | 4.35 | 50.6 |
| Do | 0.5 | 7½ | 93 | 4.35 | 9.3 |
| Do | 0.5 | 3¾ | 150 | 4.35 | 14.1 |
| Do | 0.5 | 7½ | 150 | 4.35 | 39.7 |
| Sesame Oil | 1.0 | 2 | 93 | 3.13 | (¹) |
| Do | 0.75 | 1 | 93 | 3.13 | 254.0 |
| Do | 0.5 | 3¾ | 93 | 3.13 | 6.7 |
| Mixture of rape and sesame oils (80% rape and 20% sesame by weight) | 0.75 | 3¾ | 93 | | 30.1 |
| Do | 1 | 3¾ | 93 | | 350.0 |
| Soybean Oil | 1 | 1½ | 93 | | (²) |
| Do | 0.75 | 3¾ | 93 | | 20.3 |
| Mixture of rape and soybean oils (80% rape and 20% soybean by weight) | 1 | 2 | 93 | | 800 |

¹ Plastic mass.
² Thick viscous mass.

The process of the present invention, wherein substantial amounts of antimony trichloride are employed as the polymerizing agent, not only makes possible the substantially complete elimination of many of the difficulties inherent in processes disclosed heretofore directly attributable to the nature of the catalysts used therein, but enables the obtaining of additional highly important improvements. These comprise, for example, substantial saving in catalyst costs, greater control of the degree to which a desired characteristic is possessed by the final product, thereby enabling purification operation to which they are subjected after leaving the polymerization zone of the process of the invention.

Example II

A mixture of equal parts by weight of raw rapeseed oil and antimony trichloride is heated at a temperature of 93° C. with stirring for a period of 3¾ hours. A dark-colored, viscous, liquid reaction product is obtained. This reaction product is diluted with an approximately equal volume of benzene and the resulting mixture extracted with 20% hydrochloric acid to separate antimony trichloride therefrom. After separation of the antimony trichloride-containing hydrochloric acid solution, any hydrochloric acid retained by the polymerized rapeseed oil-benzene mixture is separated therefrom by washing with water. The benzene is then distilled from the washed, polymerized rapeseed oil. The polymerized rapeseed oil product thus obtained has a viscosity of 50.6° $E_{50}$.

The claimed invention is:

1. The process for polymerizing a fatty oil having an iodine value below about 140 which comprises heating an admixture consisting of about equal parts by weight of said fatty oil and liquid antimony trichloride at a temperature of from about 80° C. to about 150° C. for a period of from about ½ to about 15 hours.

2. The process for polymerizing a fatty oil having an iodine value below about 160 which comprises heating said fatty oil in admixture with about an equal part by weight of liquid antimony trichloride at a temperature of from about 75° C. to about 200° C. for a period of time in the range of from about ½ to about 15 hours.

3. The process for polymerizing a fatty oil having an iodine value below about 140 which comprises heating a mixture of said fatty oil and liquid antimony trichloride containing a ratio of liquid antimony trichloride to said fatty oil in the range of from about 0.5 to 1 by weight at a temperature of from about 80° C. to about 150° C. for a period of time in the range of from about ½ to about 15 hours.

4. The process for polymerizing a fatty oil having an iodine value below about 160 which comprises heating a mixture of said fatty oil and liquid antimony trichloride containing a ratio of liquid antimony trichloride to said fatty oil in the range of from about 0.5 to 1 by weight at a temperature of from about 75° C. to about 200° C. for a period of time in the range of from about ½ to about 15 hours.

5. The process for polymerizing a fatty oil having an iodine value below about 160 which comprises heating said fatty oil in the presence of an amount of liquid antimony trichloride equal to at least ½ the weight of said fatty oil at a temperature of from about 75° C. to about 200° C. for a period of time in the range of from about ½ to about 15 hours.

6. The process for polymerizing a fatty oil selected from the group consisting of the semi-drying and non-drying fatty oils which comprises heating said fatty oil in the presence of an amount of liquid antimony trichloride at least equal to ½ the weight of said fatty oil at a temperature of from about 75° C. to about 200° C. for a period of time in the range of from about ½ to about 15 hours.

PIET MEERBURG.

REFERENCES CITED

The following references are of record in the file of this patent:

UNITED STATES PATENTS

| Number | Name | Date |
|---|---|---|
| 1,383,864 | Scobel | July 5, 1921 |

FOREIGN PATENTS

| Number | Country | Date |
|---|---|---|
| 428,993 | Great Britain | May 22, 1935 |
| 470,498 | Great Britain | Aug. 16, 1937 |